United States Patent [19]

Maury

[11] Patent Number: 4,469,244

[45] Date of Patent: Sep. 4, 1984

[54] SUCTION-TYPE DISTRIBUTOR FOR A SINGLE-SEED SEEDER

[75] Inventor: Jean-Pierre Maury, Montereau, France

[73] Assignee: Nodet-Gougis, Montereau, France

[21] Appl. No.: 375,128

[22] PCT Filed: Aug. 20, 1981

[86] PCT No.: PCT/FR81/00104

§ 371 Date: Apr. 12, 1982

§ 102(e) Date: Apr. 12, 1982

[87] PCT Pub. No.: WO82/00562

PCT Pub. Date: Mar. 4, 1982

[30] Foreign Application Priority Data

Aug. 21, 1980 [FR] France .................... 80 18291

[51] Int. Cl.³ .................................. A01C 7/04
[52] U.S. Cl. ...................... 221/200; 111/77; 221/211
[58] Field of Search ............. 221/211, 200; 111/77, 111/78

[56] References Cited

FOREIGN PATENT DOCUMENTS 2701982 10/1978 Fed. Rep. of Germany .
1410390 8/1965 France .
2174341 10/1973 France .
2249521 5/1975 France .

Primary Examiner—F. J. Bartuska
Attorney, Agent, or Firm—Frost & Jacobs

[57] ABSTRACT

The invention relates to a suction-type distributor for a single-seed seeder with a rotary apertured disk. The distributor 2 includes an aperture disk 5 rotating in a casing 4 and two adjoining selector plates 16 and 17 pivoted at 13 from the casing and provided with alternate projections 26 and 31 spaced on their edges extending around the path of apertures 6 on disk 5 so as to straddle said path, the relative angular position of the two plates being adjusted by means of a single lever 14 provided with cams 20 and 21 and pivoted at 15 on casing 4.

7 Claims, 6 Drawing Figures

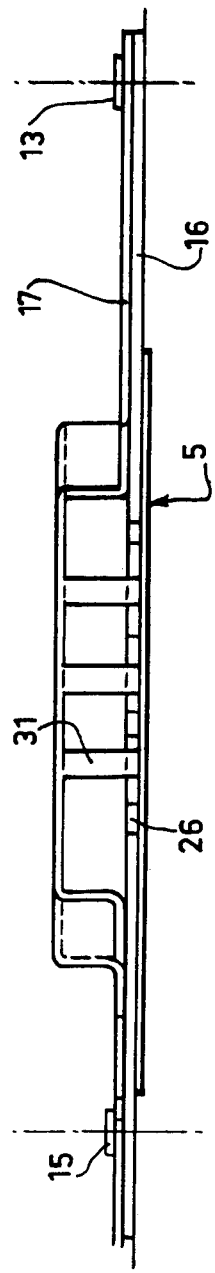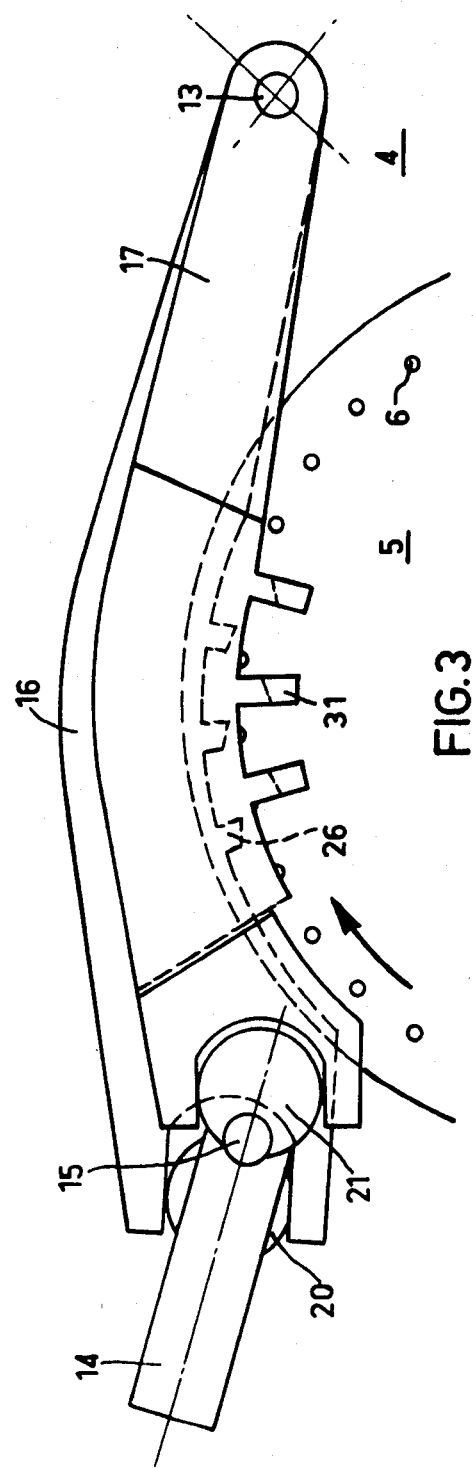

SUCTION-TYPE DISTRIBUTOR FOR A SINGLE-SEED SEEDER

FIELD OF THE INVENTION

The present invention relates to a suction-type distributor for a single-seed seeder.

The invention applies more particularly to the disk-type distributors of pneumatic seeder machines.

BACKGROUND OF THE INVENTION

The essential problem to be solved on this type of seeder is the problem of seed selection by the distributor where the apertured disk should only carry one seed per aperture. The solution of this problem lies with both the acquisition of the seeds by the suction apertures in the distributor disk and also at the member for rejecting the double seeds, hereinafter called selector, with which the modern seeders are equipped.

In a known single-seed seeder, as described in particular in French Pat. No. 1,208,202, gripping of the seeds by the suction apertures in the distributor disk is facilitated by a stirring action exerted by a stirrer when the blades rotate in parallel relationship to the disk. Solution is effected by adjustable paddles, positioned in a staggered arrangement on both sides of the path of the seeds carried by the distributor, said paddles defining said path. Selection is also effected by alternately joggling the packs of seeds acquired by the suction apertures towards the center of the disk and towards the periphery thereof. This selection system fails to be completely satisfactory in as much as the stirrer does not push the seeds towards the disk, but drive them in a direction parallel to the latter. Also, joggling the packs of seeds acquired by the suction apertures once in each direction, is in some cases insufficient.

On another improved single-seed seeder machine, described in particular in French Pat. No. 1,585,445, seed stirring in the reservoir adjacent to the carrier disk is also effected in a direction parallel to the disk, but the adjustable selection paddles of the previous seeder were replaced by a selector plate with saw-teeth so as to form a plurality of successive slanted ramps such that the saw teeth are gradually closer together in relation to the path of the suction apertures in the distributor disk. With this device, the packs of seeds caked onto the suction apertures are subjected to a series of successive impacts which cause the packs to revolve on themselves and bring forth the fall of the excessive seeds. While being satisfactory, it will be noted that with this selector plate, the seed packs are only pushed in a single radial direction, either towards the center of the distributor disk, or on the contrary, towards the periphery thereof, which may give advantage to some seeds located in a privileged position within the pack acquired by the suction aperture.

SUMMARY OF THE INVENTION

The purpose of the present invention is therefore to provide a distributor for a single-seed seeder wherein the feeding of seeds to the apertured distribution disk, as well as the removal of double seeds accquuired by the same suction aperture of this disk, are improved.

The suction-type distributor for a single-seed seeder according to the invention includes a rotary distribution disk provided with a circular row of apertures, a casing wherein the interior is divided by the disk into two adjacent enclosures where one serves as a seed reservoir and the other, which lies around a portion of the path of the disk apertures, consitutes a vacuum chamber, a double-seed removing device applied on the disk around the path of the apertures, and a stirrer located in the seed reservoir adjacent to the disk. The removing device essentially consists mainly of two adjoining selector plates pivoted at one end on the casing and disposed so as to have one edge lying around the path of motion of the distributor disk apertures, with each of said edges being provided with a plurality of successive projections extending radially towards said apertures, and said projections of one plate being located on one side of said path, while the projections of the other plate are offset and located on the opposite side in front of the gaps between the projections of the first plate.

Preferably, the selector plates are hinged about a common pin secured to the casing adjacent to the periphery of the distribution disk and at a right angle to the latter, said plates extending from their hinge pin in a direction opposite to the direction of rotation of the disk.

Preferably, the distributor according to the invention, includes means for adjusting the relative angular positioning of the two selector plates, said adjusting means mainly consisting of a lever pivoted on the casing and provided with eccentric cams located on either side of the pivot pin of said lever, said cams being engaged within corresponding terminal recesses provided at the tips of the plates in their ends opposite to their pivotal connections with the casing.

Since improvement in the accuracy of seed selection also includes improvement in acquiring said seeds by the suction apertures during passage through the reservoir, the invention also provides for orienting the axis of rotation of the stirrer in a direction parallel to the plane of the distribution disk so that the stirrer rotation will move the seeds toward the disk. Due to this privileged arrangement it is possible, according to the invention, to ensure driving of the stirrer by the distribution disk itself through simple coupling means arranged therebetween. Preferably, said coupling means consist either of a roller of a material having a high coefficient of friction, such as rubber, said roller being mounted on the axis of rotation of the stirrer and rolling on the disk, or fastened with a pinion on the stirrer shaft and a plurality of recesses provided in a circular row in the disk about its axis of rotation, so that the teeth of the pinion will mesh with said recesses.

BRIEF DESCRIPTION OF THE DRAWINGS

The invention will now be described in more detail with reference to specific embodiments and the accompanying drawings.

FIG. 3 is a front view of this same double seed removing device of FIG. 2.

FIG. 4 shows a side view of the removing device of FIG. 3.

DESCRIPTION OF THE PREFERRED EMBODIMENT

Figure 1:
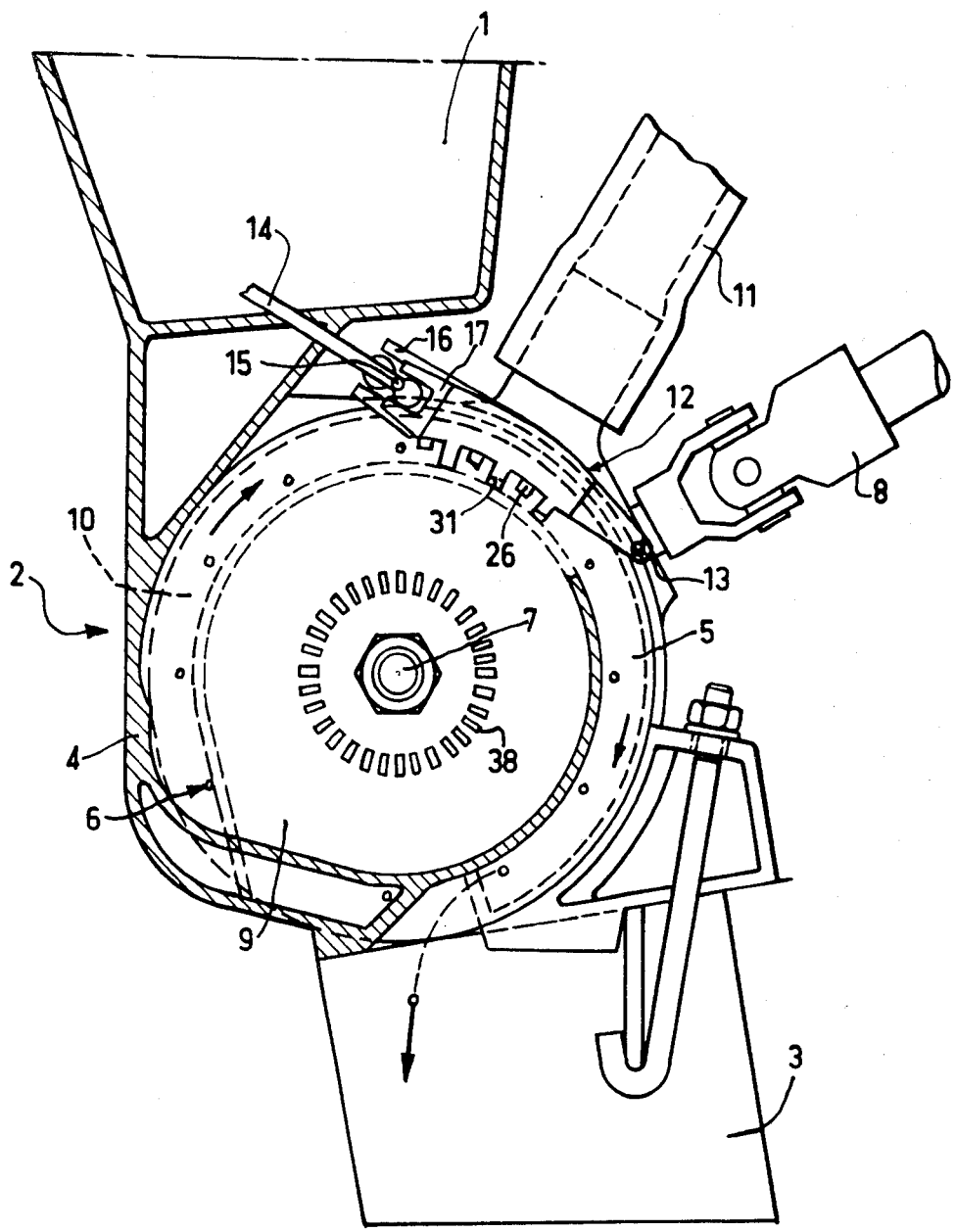
FIG. 1 is a diagrammatical sectional showing of a distributor for a pneumatic seeder according to the invention.

As shown in FIG. 1, the single-seed pneumatic seeder according to the invention comprises, in the conventional manner, such as described in particular in French Pat. Nos. 1,208,202 and 1,585,445 where reference may be had for further details, a seed hopper 1 lying over a suction type distributor 2 in turn located above a lower ploughshare 3 for cutting furrows in the ground, the assembly being carried by a conventional chassis not shown.

The distributor 2 consists in known manner of a casing 4, the interior of which is divided into two adjacent enclosures by a rotary distribution disk 5, provided towards its periphery with a circular row of apertures 6 which rotate about a central shaft 7 by means of gears, not shown, and a cardan 8 effecting coupling with the P.T.O., one wheel of the seeder, or any other member providing a rotational speed proportional to the travel of the seeder. One of the enclosures having disk 5 as a partition communicates with an outlet provided at the bottom of hopper 1 and serves as a seed reservoir 9, while the other enclosure 10, also having disk 5 as a lateral partition, is connected through a hose 11 to a suction source, not shown, and acts as a vacuum chamber. Enclosure 10 extends circularly about a major portion of the path of travel of the apertures 6 in the distribution disk 5, from the interior of the seed reservoir 9 formed by the first enclosure, to the lower portion of the distributor.

Arranged at the upper portion of the distributor, in a manner known per se, is a double-seed removing device 12 of elongated shape which is adjacent the distribution disk 5 and lies in a circular arc about the path of the apertures 6 in said disk. This removing device 12 is pivoted on casing 4 about a pin 13 secured in close proximity to the periphery of disk 5 at a right angle to the latter. An adjusting lever 14 also pivots on the casing 4 of the distributor about a pin 15 for adjusting the distance bertween the toothed edges of device 12 and the circular path of motion of the suction apertures 6 in the distribution disk.

When the suction apertures 6 of disk 5 move between the seed reservoir 9 and the adjacent suction chamber 10, they acquire by suction one or more seeds in the reservoir 9 and carry them to the upper portion of the distributor. The packs of seeds acquired by the suction apertures meet the successive teeth of the removing device 12, which joggle them and cause them to revolve on themselves about the suction aperture axis, thus dislodging the excessive seeds. The dislodged seeds fall back in reservoir 9.

The last seed remaining on the suction aperture which is moving below the removal device 12 has an opportunity to assume a correct position on said aperture where it is firmly held, enabling it to continue its travel down to the bottom of the distributor where the suction in chamber 10 is interrupted. Since the suction from apertures 6 is interrupted, the carried seed falls between the blades of ploughshare 3 within the furrow cut by the latter.

Figure 2:
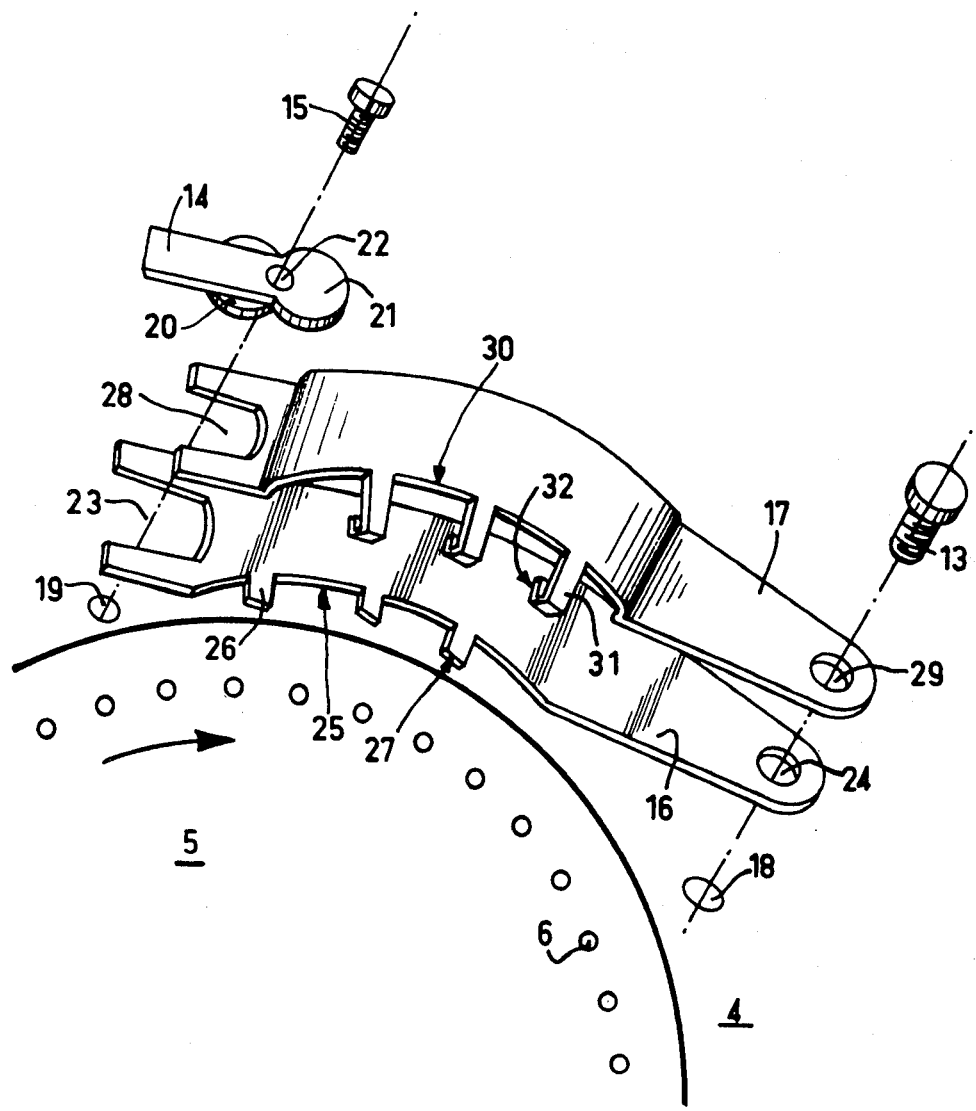
FIG. 2 is an exploded perspective view of the double seed removing device of the distributor of FIG. 1.

As shown especially in FIGS. 2, 3 and 4, the double-seed removing device according to the invention mainly consists of two selector plates 16 and 17, fastened by a pivot pin 13 force-fitted into a hole 18 provided in the distributor casing 4 close to the periphery of apertured disk 5, and of an adjustment lever 14 pivoted about a pin 15 which is force-fitted into a hole 19 provided in casing 4 close to the edge of apertured disk 5. Lever 14 is provided with two cams 20 and 21 eccentrically located on either sides of the pivot hole 22. Both cams 20 and 21 have the shape of a circular disk and are adjoining.

Selector plate 16 is elongated and its upstream end with respect to the direction of rotation of disk 5, is bifurcated and provided with a notch 23 for accomodating cam 20 of lever 14. The downstream end of plate 16 is provided with a pivot hole 24. The edge 25 of plate 16 which faces distribution disk 5 is curved with a curvature substantially equal to that of the path of the suction apertures 6 of disk 5 and is provided with evenly spaced projecting studs 26 extending towards said path of apertures 6 with edges being slightly slanted obliquely to the path of the apertures.

The second distributor plate 17 which is adjacent to plate 16 has a general shape similar to the latter and also includes a bifurcated upstream end provided with a notch 28 for accommodating cam 21 of lever 14 and a downstream end provided with a pivot hole 29. Its edge 30 facing disk 5 is also curved with a radius of curvature approximate the path of apertures 6 and is also provided with studs 31 evenly spaced so as to be interposed between the studs 26 of plate 16 when the two plates are adjoining.

The portion of plate 17 that includes the edge 30 provided with studs 31 is stamped and offset with respect to both ends of said plate 17, so that when the two plates 16 and 17 are adjoining, only the terminal portions of plate 17 contact plate 16, while the central portions provided with the studs remain slightly spaced from each other in two parallel planes.

Upon being assembled, plate 16 is fastened on disk 5 so that the suction apertures 6 move past the slanted edges 27 of studs 26 which all lie on the same side of the path of the apertures, e.g. on the outer side in the embodiment shown. Adjoining plate 17 is also fastened on disk 5 and its edge 30 is located close to the path of the suction apertures in the disk. Studs 31 are bent inwardly in a hook-shape so as to have their terminal porton 32 substantially located in the same plane as studs 26 of plate 16, in other words, adjacent the plane of disk 5 as shown in FIG. 4.

Upon assembly of both plates 16 and 17 of device 12, the path of suction apertures 6 of disk 5 is straddled by a double series of studs 26 and 31 alternately disposed on both sides of said path yet disposed on the same side as the disk 5. Since the two plates 16 and 17 are pivoted about pin 13 which is fitted in hole 18 at a right angle to the plane of disk 5, angular adjustment of said plates makes it possible to simultaneously move studs 26 and 31 closer or farther from the path of motion of suction apertures 6. This adjustment is provided by means of lever 14 rotating about its hinge pin 15 and acting on plates 16 and 17 through the two cams 20 and 21 accommodated in the notches 23 and 28 respectively. Pivotal motion of said lever makes it possible to cause a jaw-like opening or closing motion of the two plates which results in broadening or narrowing of the wedge-shaped passageway between the opposite rows of studs 26 and 31. Worthy of notice is that said passageway is funnel-shaped and tends to taper off in the direction of rotation of disk 5 so that the seed selection becomes more and more severe as the packs of seeds acquired by apertures 6 advance between said opposite rows of alternating studs.

The operation of the selection device according to the invention may be easily understood.

The aggregates of seeds acquired by the suction apertures 6 of disk 5 are successively and alternately joggled, on the one hand, by the edges 27 of studs 26 which push said aggregates towards the center of the disk and cause them to revolve clockwise and, on the other hand, by the ends 32 of the opposite studs 31 which, contarily, push said aggregates outwardly and towards the disk periphery and cause them to revolve anticlockwise. The seed packs thus joggled about lose their excessive seeds until they only retain at the outlet of removal device 12 one single seed which was allowed by its privileged position at the center of the suction aperture to withstand the repeated joggling of the device without being ejected. In operation, the angle between the two plates 16 and 17 remains constant and lever 14 is locked. However, in case the type and size of seeds is changed, variation of said angle between the two plates is possible by pivotal motion of lever 14 about its pin 15.

To further improve seed selection and avoid double seeds on one suction aperture, provision is also made according to the invention for correctly locating the seeds on the apertures as soon as they are acquired in the seed-box for, when a seed is perfectly positioned on a suction aperture, it substantially wholly masks the same, thereby preventing suction of a second seed, thus avoiding the need to subsequently remove excessive seeds.

Consequently, to improve the acquiring of the seed, provision is also made according to the invention for promoting seed stirring in the seed reservoir, especially by pushing the seeds towards the distribution disk by means of a stirrer which rotates about an axis substantially parallel to the plane of the disk.

Figure 5:
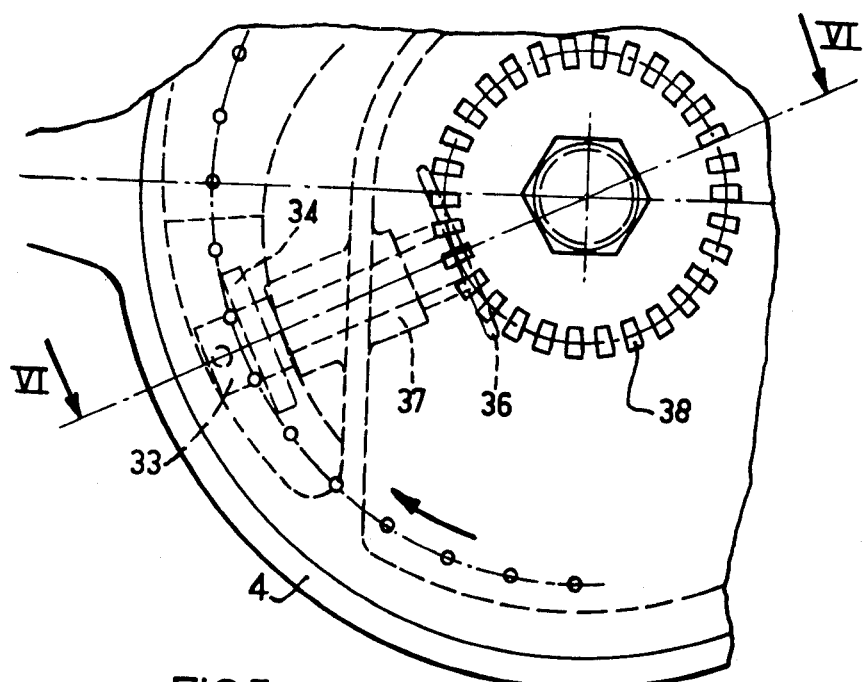
FIG. 5 shows a partial view of the lower distributor portion wherein the stirrer according to the invention in located.
Figure 6:
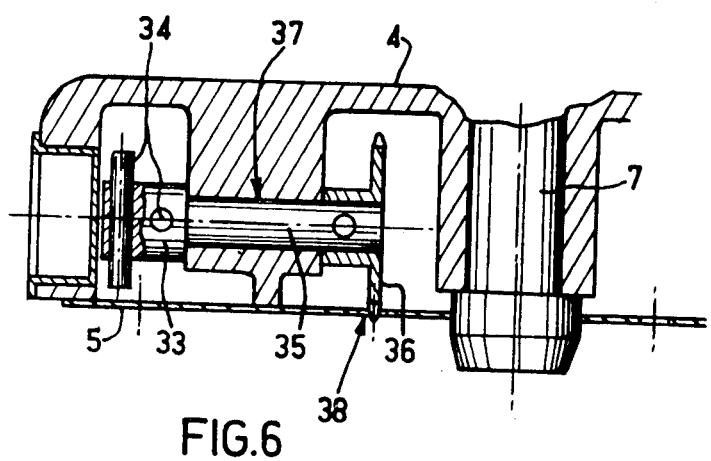
FIG. 6 is a section of the distributor in FIG. 5 through the stirrer axis, along line VI—VI of FIG. 5.

As shown in FIGS. 5 and 6, the distributor according to the invention includes, within the interior and at the lower portion of the seed-box in casing 4, a stirrer 33 provided with stirring paddles 34 mounted on one end of a shaft 35, which is provided at its other end with a toothed pinion 36. Shaft 35 is rotatably mounted in parallel relationship to the plane of distribution disk 5 in a plain bearing 37 supported by the wall of the distributor casing 4. To effect rotational drive of stirrer 33, there is provided on distribution disk 5 a circular row of recesses 38 (see FIG. 5) which are evenly spaced all around the central axle 7 of the disk. The teeth of pinion 36 keyed on the stirrer shaft 7 mesh with said recesses 38 in such manner that rotation of disk 5 causes simultaneous rotation of stirrer 33, which has its paddles 34 located at the suction apertures 6 and pushes the seeds toward the apertures.

It will be noticed that the particular arrangement of the stirrer according to the invention, i.e., rotating the stirrer about an axis which is parallel to the plane of the disk, makes it possible to effect driving of said stirrer by means of the disk itself and to suppress any countergearing.

Alternately, the pinion 36 keyed on stirrer shaft 35 as well as the recesses 38 provided in the distribution disk may be replaced by a mere roller of a material having a high coefficient of friction such as rubber keyed on shaft 35 of stirrer 33, and applied on the face of disk 5 so as to effect transmission of motions by frictional contact.

It will be understood that the scope of the invention is not limited to the sole embodiment described above by way of non restrictive example but also extends to every modified embodiment only differing by details.

Thus, in particular, the two selector plates 16 and 17 may be used to effect seed selection not along one single circular row of suction apertures, but along two distinct concentric rows, each selector plate being associated with one particular row while there is but one selection adjustment carried out through a single adjustment lever. In this case, to prevent the excess of seeds removed from the outer row of suction apertures from falling on the inner row of apertures without possible subsequent removal, the last effective stud in the direction of disk rotation should belong to the selector plate associated with the inner row of apertures.

What I claim is:

1. A suction-type distributor for a single-seed seeder including a rotary distribution disk provided with a circular row of apertures, a casing having its interior divided by the disk into two adjacent enclosures wherein one serves as a seed reservoir and the other, lying around a portion of the path of motion of the disk apertures, constitutes a vacuum chamber, a double-seed removing device fastened adjacent the disk around the path of the apertures and a stirrer located in the seed reservoir adjacent to the disk, whereby the double removing device essentially consists of two adjoining selector plates each pivoted at one end on the casing about a pin at right angle to the distribution disk and so disposed as to have one edge lying around the path of the apertures of said disk, in that each of said edges of the selector plates is provided with a plurality of successive projections having a gap therebetween and extending radially towards said apertures, and in that the projections of one plate are located on one side of said path while the projections of the other plate are offset and located on the opposite side of the path and in front of the gaps between the projections of the first plate.

2. The distributor according to claim 1, characterized in that said selector plates extend from their pivot pin, in a direction opposite to that of rotation of the disk and are so arranged and disposed with respect to one another that the two confronting rows of projections along the edges of said plates define a funnel-shaped passage which tapers off in the direction of rotation of the disk.

3. Distributor according to either of claims 1 or 2, characterized in that it includes means for adjusting the mutual angular positioning of the two selector plates.

4. Distributor according to claim 3, characterized in that said adjusting means essentially consist of a lever pivoted on said casing and provided with eccentric cams on either side of the pivot pin of said lever, said cams being engaged in corresponding terminal recesses provided at the tip of said plates, in their ends opposite their pivotal connections with the casing.

5. Distributor according to claim 1, characterized in that the stirrer disposed in the reservoir rotates about an axis substantially at right angle to the axis of rotation of the distribution disk and in that rotational coupling means are provided between disk and said stirrer.

6. Distributor according to claim 5, characterized in that said coupling means consist of a pinion fastened to the stirrer shaft, said pinion including teeth, and of a circular row of successive recesses provided in the disk about the axis of rotation thereof, the teeth of the pinion meshing with the recesses in the disk.

7. Distributor according to claim 5, characterized in that the coupling means consist of a roller made of a material having a high coefficient of friction, mounted on the stirrer shaft and rolling on said disk.

* * * * *